3,160,631
DERIVATIVES OF CEPHALOSPORIN C

Louis H. Peterson, Woodbridge, and Arthur A. Patchett, Metuchen, N.J., assignors to Merck & Co., Inc., Rahway, N.J., a corporation of New Jersey
No Drawing. Filed Nov. 16, 1961, Ser. No. 152,941
3 Claims. (Cl. 260—243)

This invention relates to organic compounds having antibiotic activity and, more particularly, it is concerned with acyl dialkyl esters of cephalosporin C and to methods for the preparation of these derivatives.

The antibiotic substance cephalosporin C and its preparation by fermentation of a suitable species of cephalosporium have been described in the art. The antibiotic, which has been found to have the following structure:

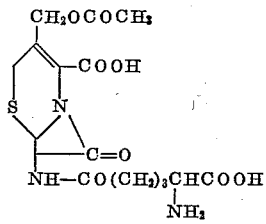

is active against both gram positive and gram negative bacteria.

Accordingly, it is an object of the present invention to provide novel derivatives of cephalosporin C having antibiotic activity.

Another object of this invention is to provide acyl dialkyl esters of cephalosporin C and processes for the preparation of these derivatives.

A more specific object of this invention is to provide the dimethyl ester of N-benzoyl cephalosporin C by the acylation of cephalosporin C with benzoyl chloride followed by alkylation with diazomethane.

These and other objects will be made apparent from the following more detailed description of the invention as illustrated in the several embodiments thereof.

In accordance with the present invention, it is now found that acylated cephalosporin C and its derivatives can be converted to the corresponding dialkyl esters by procedures which can be illustrated structurally as follows:

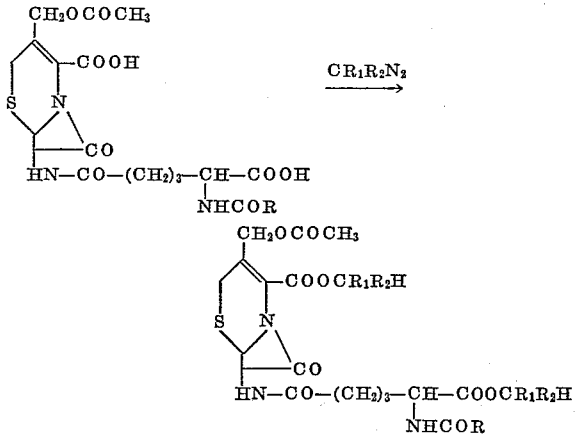

wherein $CR_1R_2N_2$ is a diazoalkane or substituted diazoalkane and RCO— is an acyl group.

In accordance with the above-described procedure, cephalosporin C, or a derivative thereof, is acylated to produce the corresponding N-acyl derivative used as a starting material. Then the acyl derivative is reacted with a diazoalkane to effect alkylation of the N-acylated compound to form the desired acyl dialkyl ester product.

In the examples which follow, several suitable acylating agents and diazoalkanes are presented by way of illustration and not of limitation. It will be understood by those skilled in the art that other commonly-known acylating agents and diazoalkanes may be used as well. Typically, an acyl chloride or an acid anhydride will be used to introduce the acyl group, RCO—. The R in such an acyl group generally is selected from among alkyl, aryl, phenyl, alkoxy and aralkoxy groups. For example, such acylating agents as acetyl chloride, phenylacetyl chloride, carbobenzoxyl chloride, heptylic anhydride and 3,4-dimethoxyacetyl chloride, illustrate a few of such agents. Preferably, the R group in RCO— is a hydrocarbon or a hydrocarbon substituted radical having from 1 to 20 carbon atoms.

The scope of the diazoalkane, $CR_1R_2N_2$, wherein $R_1$ and $R_2$ are selected from among hydrogen and hydrocarbon substituted radicals having from 1 to 20 carbon atoms, is typified by diazomethane where both $R_1$ and $R_2$ are hydrogen, diazoethane where $R_1$ is hydrogen and $R_2$ is ethyl, phenyldiazomethane where $R_1$ is hydrogen and $R_2$ is phenyl, and diphenyldiazomethane where both $R_1$ and $R_2$ are phenyl.

The first step of this process is conveniently effected by intimately contacting cephalosporin C with an acyl chloride in aqueous medium in the presence of a mild base at ice temperature. In carrying out this reaction, the acylating agent is preferably added to the aqueous solution of a water soluble salt of cephalosporin C; the reaction is conveniently effected in the presence of a suitable water-miscible organic solvent for the acylating agent, such as acetone and the like. Alternatively, a solution of the acylating agent in a suitable water-miscible solvent can be added to the aqueous solution of the cephalosporin. After completion of the reaction, the N-acyl compound is recovered by acidifying the aqueous reaction mixture or by extracting the acidified mixture with the water-miscible solvent for the acid, such as methylisobutylketone. If desired, the acyl compound can be further purified by crystallization from a suitable solvent or solvent mixtures in accordance with procedures well known in the art.

The N-acyl derivative of cephalosporin C so prepared is then converted to the corresponding dialkyl ester by reaction with a diazoalkane. This step is most conveniently effected by adding the diazoalkane in ether to an ether-dioxane solution of the acyl compound under cooling for a time sufficient to complete the formation of the diester, and then separating the crystalline product in solution by filtration. The product obtained in this way can be further purified by crystallization from suitable solvents or solvent mixtures to produce the ester in pure form.

The following examples will illustrate the more specific details of the process of the present invention.

EXAMPLE I

*Preparation of the Dimethyl Ester of N-Benzoyl Cephalosporin C*

Ten grams of cephalosporin C disodium salt (21.2 mmoles) is dissolved in water and cooled to 0° C. To this solution is added 160 ml. of 10% sodium bicarbonate solution (190 mmoles) and 320 ml. of acetone. When the temperature has reached 0° C., a solution of 3.0 ml. (26 mmoles) of benzoyl chloride in 80 ml. of acetone is added. The mixture is stirred at 0° C. for 20 minutes, the bath removed and stirring continued for another 20 minutes. The mixture is diluted with water, extracted with chloroform and acidified with 2 M phosphoric acid to pH 2. The acidified solution is salted and thoroughly extracted with methyl isobutyl ketone. The extracts are washed with salt water, dried over anhydrous magnesium sulfate and concentrated to a residue weighing about 12.5 g.

This residue is taken up in 125 ml. of dioxane and 25 ml. of ether and cooled in an ice bath. A solution of diazomethane in 150 ml. of ether, which has been prepared from 25 g. of 50% nitrosomethyl urea and 40 ml. of 40% potassium hydroxide, is added slowly. A vigorous reaction occurs at first. The color persists and crystals gradually separate which are filtered off, washed with ether and dried. Recrystallization from $CHCl_3$-ether yields 8 g. of the dimethyl ester; M.P. 197–198° C.

*Analysis.*—Calcd. for $C_{25}H_{29}N_3O_9S$: C, 54.83; H, 5.35; N, 7.68; S, 5.85. Found: C, 54.66; H, 5.10; N, 7.05; 6.82; S, 5.53, U.V. 262 E% 149; 226 E% 265. I.R. major peaks at 5.60, 5.75, 6.01, 6.50, 7.38, 8.20, 9.02 and $9.7\mu$ in pyridine solution; 25 mg./ml.

The compounds of the present invention find wide utility as an antibiotic in vivo against *Staph. aureus* Smith. Furthermore, they may be used as intermediates in the preparation of other cephalosporin C compounds which have antibiotic activity against the same bacteria.

EXAMPLE II

*Preparation of the Dimethyl Ester of N-Carbobenzoxy Cephalosporin C*

Five grams of cephalosporin C are dissolved in 200 ml. of water and cooled to below 10° C. Then 75 ml. of 10% sodium bicarbonate solution is added, followed by 200 ml. of acetone. When the temperature is reduced to 0° C., a solution of 2 ml. of 2.4 g. of carbobenzoxy chloride in 80 ml. of acetone is added. The solution is stirred with cooling for 20 minutes and then without cooling for 15 minutes.

The solution is extracted twice with chloroform, acidified with 2 M phosphoric acid and extracted three times with methyl isobutyl ketone. The extracts are washed, dried with magnesium sulfate and evaporated to a residue which weighs about 6 g. This material is dissolved in 80 ml. of dioxane and 20 ml. of ether. This is cooled and an ether solution containing an excess of diazomethane is added. After the reaction has been completed (10–15 minutes), further addition of ether does not give crystals. After concentration of the solvent, the residue is treated with methanol which yields some crystals. From chloroform solution products then can be obtained by dilution with ether. The second crop melts at 141–143° C. and has I.R. bands at 5.60, 5.75, 5.82, 5.95, 6.5, 7.3, 8.0–8.3 and $9.5–9.8\mu$.

It is further purified by recrystillization from methanol; M.P. 146–150° C.

EXAMPLE III

Following the teaching described in detail in the above example and using equivalent quantities of diazoethane, phenyldiazomethane and diphenyldiazomethane in place of diazomethane, there are produced the corresponding acylated esters of cephalosporin C.

While several illustrative acylating agents and diazoalkanes have been presented, it will be understood by those skilled in the art that other commonly known acylating agents and diazoalkanes may be used as well.

What is claimed is:

1. An acylated cephalosporin C ester of the formula:

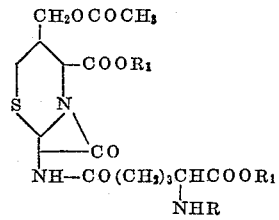

wherein R is selected from the group consisting of carbobenzoxy and benzoyl and $R_1$ is selected from the group consisting of lower alkyl and phenyl.

2. The dimethyl ester of N-benzoyl cephalosporin C.

3. The dimethyl ester of N-carbobenzoxy cephalosporin C.

References Cited in the file of this patent

Burger: Medicinal Chemistry, pages 46–47 (1960).

Wertheim: Textbook of Organic Chemistry, pages 763–764.

Morton: The Chemistry of Heterocyclic Compounds, page VI of the preface (1946).

Jour. American Medical Assoc., page 466, May 24, 1958.